United States Patent [19]

Velardo, Jr. et al.

[11] Patent Number: 5,587,998
[45] Date of Patent: Dec. 24, 1996

[54] METHOD AND APPARATUS FOR REDUCING RESIDUAL FAR-END ECHO IN VOICE COMMUNICATION NETWORKS

[75] Inventors: Patrick M. Velardo, Jr., Belleville; Woodson D. Wynn, Basking Ridge, both of N.J.

[73] Assignee: AT&T, Holmdel, N.J.

[21] Appl. No.: 398,272

[22] Filed: Mar. 3, 1995

[51] Int. Cl.$^6$ .................................................. H04B 3/20
[52] U.S. Cl. ........................ 370/289; 379/409; 379/410
[58] Field of Search ................................. 370/32, 32.1, 6; 379/410, 411, 406, 390, 407, 409

[56] References Cited

U.S. PATENT DOCUMENTS

| | | | |
|---|---|---|---|
| 4,577,071 | 3/1986 | Johnston | 370/32.1 |
| 4,582,963 | 4/1986 | Danstrom | 379/411 |
| 4,587,382 | 5/1986 | Yang | 370/32.1 |
| 4,751,730 | 6/1988 | Galand | 370/32.1 |
| 4,764,955 | 8/1988 | Galand et al. | 370/32.1 |
| 4,864,608 | 9/1989 | Miyamoto | 370/32.1 |
| 4,991,166 | 2/1991 | Julstrom | 370/32.1 |
| 4,991,167 | 2/1991 | Petri | 370/32.1 |
| 5,157,653 | 10/1992 | Genter | 370/32.1 |
| 5,274,705 | 12/1993 | Younce | 370/32.1 |
| 5,283,784 | 2/1994 | Genter | 370/32.1 |
| 5,313,498 | 5/1994 | Sano | 370/32.1 |
| 5,406,552 | 4/1995 | Long et al. | 379/410 |
| 5,408,530 | 4/1995 | Makino et al. | 379/410 |
| 5,414,766 | 5/1995 | Cannalire et al. | 379/406 |

OTHER PUBLICATIONS

International Patent Application PCT/AU93/00626 (International Publication WO94/14248), by J. Portelli. Translation: yes.

O. M. Mracek Mitchell and D. A. Berkley, "A Full–Duplex Echo Suppressor Using Center–Clipping," Bell System Technical Journal 50 (1971), pp. 1619–1630.

"The Voice Activity Detector for the PAN–European Digital Celular Mobile Telephone Service," by D. K. Freeman et al., in IEEE Conf. ICASSP, 1989, Section S7.6, pp. 369–372.

K. Nayebi et al., "On the Design of FIR Analysis–Synthesis Filterbanks with High Computational Efficiency," IEEE Trans. Signal Processing 42 (Apr. 1994).

G. Clifford Carter, ed., Coherence and Time Delay Estimation, IEEE Press, 1993.

*Primary Examiner*—Alpus H. Hsu
*Assistant Examiner*—Seema S. Rao
*Attorney, Agent, or Firm*—Stuart H. Mayer

[57] ABSTRACT

A method and apparatus are described for reducing, in communication signals received by a local network from a remote network (FAR-IN signals), that energy content that is attributable to echoes of signals transmitted into the local network (NEAR-IN signals). This is achieved, in part, by generating a time-varying TEMPLATE signal which represents the smoothed energy content of NEAR-IN signals delayed according to the echo path and attenuated by an estimated echo transmission loss. A non-linear processor passes the FAR-IN signal substantially without attenuation if it exceeds the threshold derived at least in part from the TEMPLATE, but attenuates the FAR-IN signal if it lies within a defined range below the threshold.

35 Claims, 6 Drawing Sheets

METHOD AND APPARATUS FOR REDUCING RESIDUAL FAR-END ECHO IN VOICE COMMUNICATION NETWORKS

FIELD OF THE INVENTION

This invention relates to techniques for processing speech signals in communication networks and, more particularly, relates to processing for the suppression of far-end echoes.

BACKGROUND OF THE INVENTION

It has long been recognized that in many voice communication networks, the far end has an annoying tendency to return to the near-end speaker a delayed replica of his voice transmissions. Such far-end echo is especially bothersome when it occurs at a delay of about 40 ms or more, because at such delays, the echo tends to be distinctly perceived by the near-end speaker as distracting noise. Thus, far-end echo poses especially severe problems for those types of network whose operation entails such relatively large delays. These include satellite networks, and at least some networks that perform coding and compression of speech.

Devices are, in fact, available that would enable the far-end speaker to suppress or cancel the near-speech component that he is unintentionally returning to the near end. However, there will be cases when the far-end speaker is not using such a device. Moreover, even if such an echo-suppressing or echo-canceling device is being used at the far end, it may not be completely effective for removing echo. Thus, in many cases there will be at least residual echo returned to the near end.

As a consequence, it will often be desirable for the near-end speaker to operate a device that can reduce those components of near speech that are returned to the near-end speaker after traversing a round trip through the remote communication network.

An early nonlinear processor for reducing echo was described in O. M. Mracek Mitchell and D. A. Berkley, "A Full-Duplex Echo Suppressor Using Center-Clipping," *Bell System Technical Journal* 50 (1971), pages 1619–1630. When this article was published, echo cancellers were not yet in use. In the article, the authors described a sub-band center clipper for use as a stand-alone device to replace a conventional (at the time of publication) echo suppressor at the far (i.e., receiving) end. This center clipper had no adaptations for situations where there is a substantial echo delay.

U.S. Pat. No. 5,274,705, issued to Younce et al., describes a more recent effort to suppress residual echo using a device at the far (receiving) end. Echo that has not been completely removed by a conventional echo canceler is further removed by a non-linear processor. In this non-linear processor, an estimate of the background noise level is used to set a fullband, noise-transparency threshold. Transmissions falling below this threshold are transmitted in order to mask residual echo and to avoid unnatural-sounding interruptions of the background noise. This technique also uses the energy in an echo replica, based on an estimated gain for the echo path, to set a time-varying threshold for fullband center clipping.

The Younce technique may, in some cases, fail to achieve a satisfactory degree of echo control. For example, residual echo that survives the center-clipping process will extend over the full frequency band, and thus may be recognizable as speech (and hence, be distracting) even at very low signal-to-noise ratios. Moreover, full-band noise transparency is disadvantageous because narrow-band noise, such as power-line hum, will tend to raise the noise-transparency threshold across the full frequency band. This can result in the unintended transmission of echoes which are masked by noise only in a limited frequency range.

Practitioners in this field have recognized that a device situated at the near (transmitting) end can be used to reduce far-end echo, if it compensates for the delay incurred by transmission of the echo over a round trip through the local and remote networks. For example, International Patent Application PCT/AU93/00626 (International Publication WO94/14248), by J. Portelli, describes the use of a conventional echo canceller at the near (transmitting) end. Because there may be a substantial delay between the transmission of the near speech and the arrival of the echo that is to be cancelled, this echo canceller is operated in conjunction with a delay device which is programmed, prior to installation, to provide a fixed, compensatory delay. In the echo canceller, a fullband adaptive transversal filter generates a subtractive replica of the echo. However, certain factors may prevent this system from providing an entirely satisfactory remedy. For example, the accuracy of the echo replica is limited by line noise. This may reduce the effectiveness of the echo canceller. Moreover, circuit multiplication or compression equipment between the local and remote networks can distort portions of the echo signal, leading to incomplete suppression. This system may also suffer degraded performance due to phase roll (e.g., from analog transmission facilities), or due to quantization noise and nonlinearities introduced by speech coders in digital transmission systems.

Thus, practitioners in the field of echo control have hitherto failed to provide a fully satisfactory method that can be employed in the local network to reduce residual far-end echoes.

SUMMARY OF THE INVENTION

We have invented an improved apparatus and method of nonlinear processing that can be performed within a local communication network. Our method is highly effective for reducing the residual echo from the remote communication network, even when the echo returns with a significant transmission delay. Our method is robust to line noise and to distortions that may be introduced within the remote network by remote, nonlinear processing. Our method can also be made relatively insensitive to phase roll and to various often-encountered problems that tend to degrade the convergence of conventional echo cancelers.

In a broad sense, our invention involves the reduction of echo in voice communications that are transmitted into a network from a far location, and received from the network at a near location. (The words "far" and "near" are not intended to be limiting, other than to denote the opposite ends of a path for two-way communication. At several places herein, the word "local" may be substituted for "near," and the word "remote" substituted for "far.")

According to the practice of the invention, as broadly defined, signals transmitted into the network at the near location are received, by an appropriate signal processing device, as "near input." Signals transmitted into the network from the far location are received by the same processing device as "far input." The near input and the far input are compared, thereby to produce a value EPD for a quantity referred to as the "echo-path delay." This EPD is a measure of the relative time delay between those portions of the near and far input that contain similar information.

The near input is subjected to a delay equal to EPD, thereby to temporally align the near and far input signals. Then the near input and the far input are each separately decomposed into plural sub-band components.

A modulus signal is then derived from each sub-band component of the near input. That is, the absolute value of each of these sub-band signals is smoothed, resulting in a waveform which is proportional to the rms energy envelope of the sub-band signal. Each of these waveforms is then attenuated according to an echo-loss estimate. The resulting waveform, referred to hereinbelow as a "template," represents the envelope of the expected echo waveform.

Each sub-band component of the far input is then subjected to a center-clipping operation that is intended to remove weak signals on the assumption that they are echoes. The template is the threshold (referred to herein as an "upper" threshold for reasons explained below) for discriminating these weak signals. That is, each of the far-input sub-band signals will be at least partially transmitted if it exceeds the concurrent value of its respective template.

After center-clipping, the far-input sub-band components are combined, thereby to produce a synthesized, full-band, output signal.

Preferred embodiments of the invention include a second threshold, referred to herein as a "lower" threshold. A lower threshold is useful for suppressing an annoying background effect sometimes referred to as "noise pumping." This occurs when line noise or other background noise from the far end is modulated by the near-end speech, producing intermittent sounds that may resemble those of a reciprocating pump. It is well-known to mask this effect by injecting a controlled amount of noise energy after the clipping operation. However, the injected noise is generally a poor match to the frequency distribution of the actual background noise, and thus it is seldom a completely effective mask.

By contrast, in our preferred approach we arrange the center clipper to transmit sub-band components which lie below the lower threshold, which represents a noise floor. Because the lower threshold is separately determined for each sub-band component, a good match to the actual noise spectrum can be achieved even in the presence of narrow-band line noise.

Each lower threshold is derived from a respective sub-band component of the far input. The absolute value of the far-input signal is smoothed using a slow-rise, fast-decay smoother. This procedure produces an estimate of the sub-band noise floor, and is set equal to the lower threshold. Those corresponding far-input sub-band signals that fall below this lower threshold are transmitted by the center clipper and combined into the full-band output signal.

DETAILED DESCRIPTION OF A PREFERRED EMBODIMENT

Figure 1:
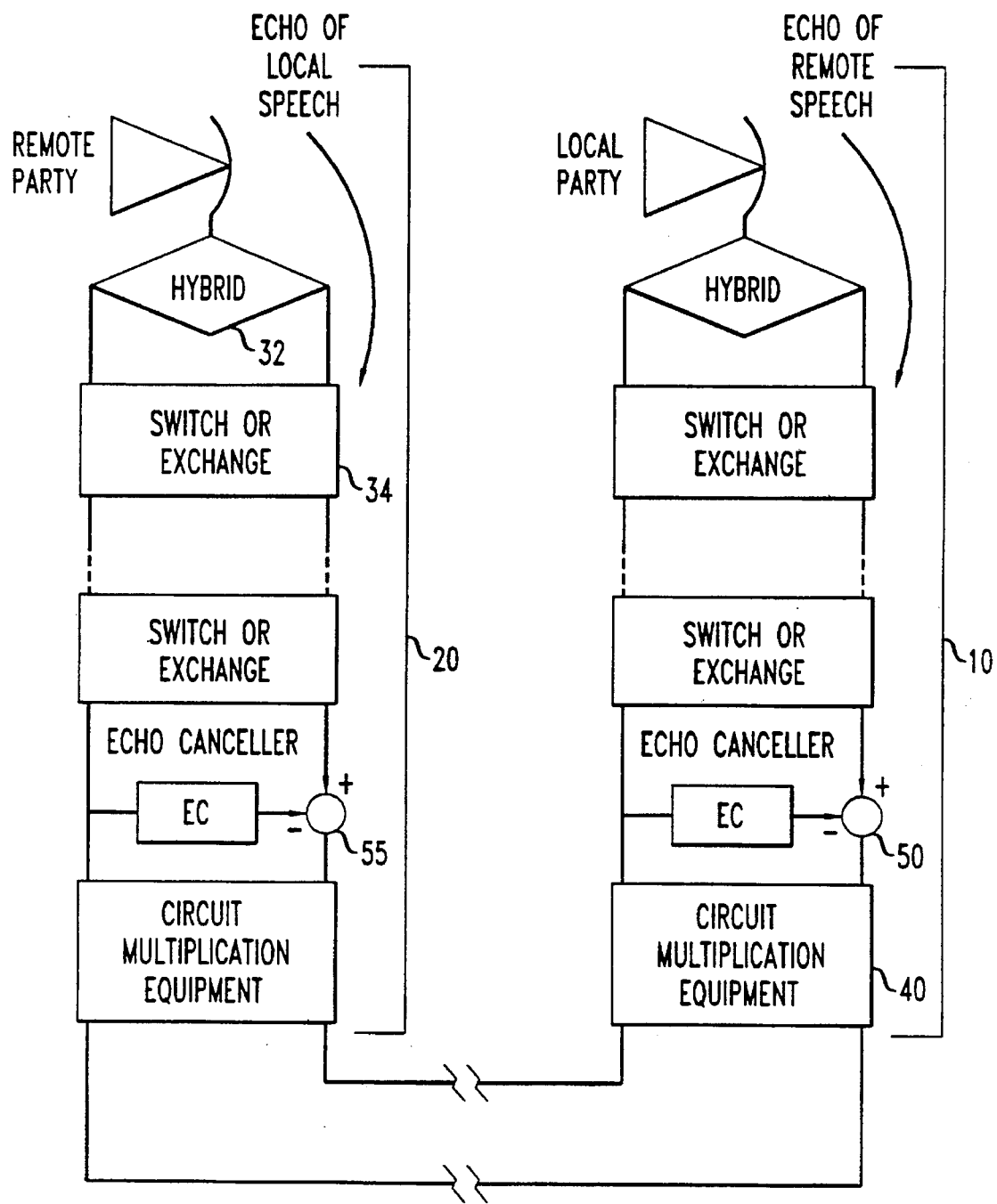
FIG. 1 depicts the general architectural features of a communication network, including conventional use of devices for echo control.

The communication network of FIG. 1 includes a local network 10, a remote network 20, and internet trunks 30. Each network 10, 20 will typically include a telephone hybrid 32, and one or more switches or exchanges 34. The internet trunks may include communication links between national and international networks, and may include links to and from communication satellites. A communication network for long-distance communications will also typically include circuit multiplication systems 40 for reducing transmission bandwidth by speech coding or other processes of speech compression. The local and remote networks may also include conventional echo-control systems 50, 55. In, for example, the remote network, a system 55 is used to reduce the near-end speech (originating in the local system) that is recycled through the remote network and returned to the near-end speaker as an echo of his own voice.

Figure 2:
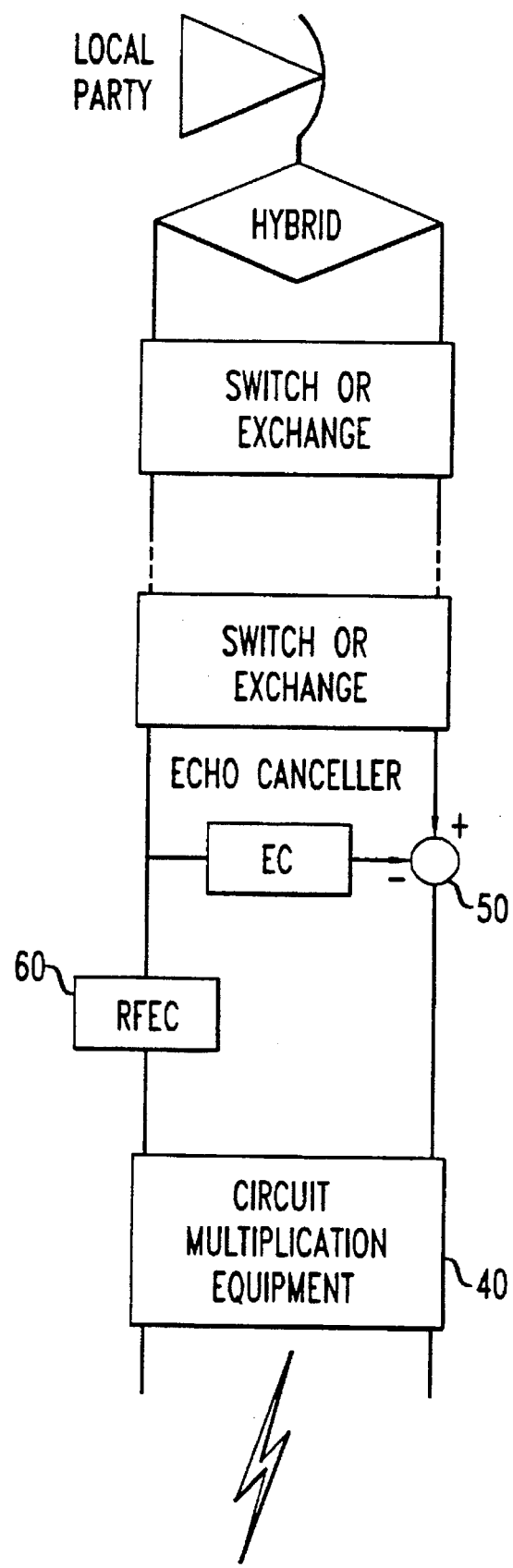
FIG. 2 illustrates, in a broad fashion, the use, in a communication network, of a system for residual, far-end echo control (RFEC).

In at least some cases, however, such a system 55 will be absent, or will fail to do an adequate job of echo reduction. In those cases, it may be advantageous for the near-end speaker to employ a system for residual, far-end echo control (RFEC) that is installed in the local network. Such an RFEC system 60, as shown in FIG. 2, is useful for further reducing the echo that is returned to the near-end speaker from the far end.

Figure 3:
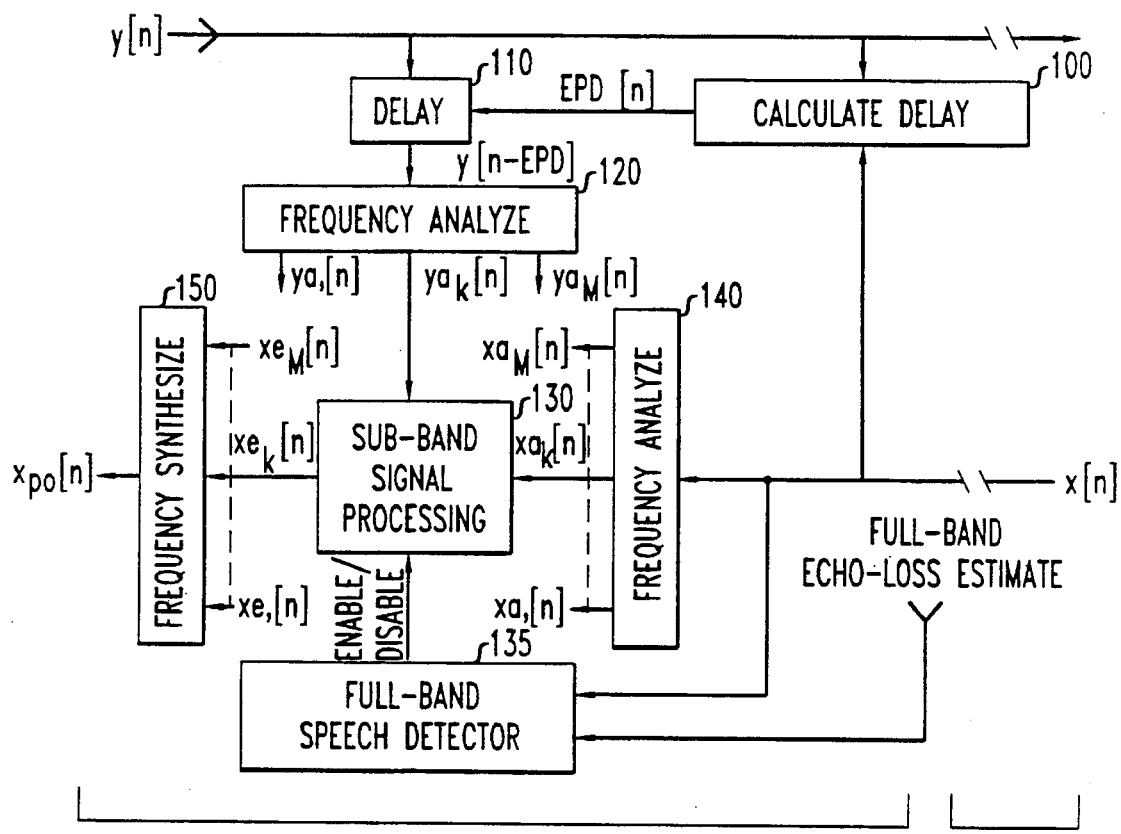
FIG. 3 is a schematic representation of a system for echo control according to the invention, in one embodiment.

Depicted in FIG. 3 is an RFEC system that operates on a full-band, near-end voice signal y[n] and a full-band, far-end voice signal x[n]. (The variable "n" denotes a discretized measure of time.) This system is advantageously implemented on a digital signal processor.

At block 100 of the figure, the system evaluates a measure EPD[n], which is an estimate of the echo-path delay between the transmitted and returned near-end signals. As explained below, an intermediate step in the derivation of EPD[n] involves calculating full-band, average, spectral energies of the near-end and far-end signals. An optional measurement of the loss between the transmitted and returned signals is readily derived from the ratio of the far-end spectral energy to the near-end spectral energy. In this ratio, the near-end spectral energy is delayed by the estimated echo-path delay.

Figure 6:
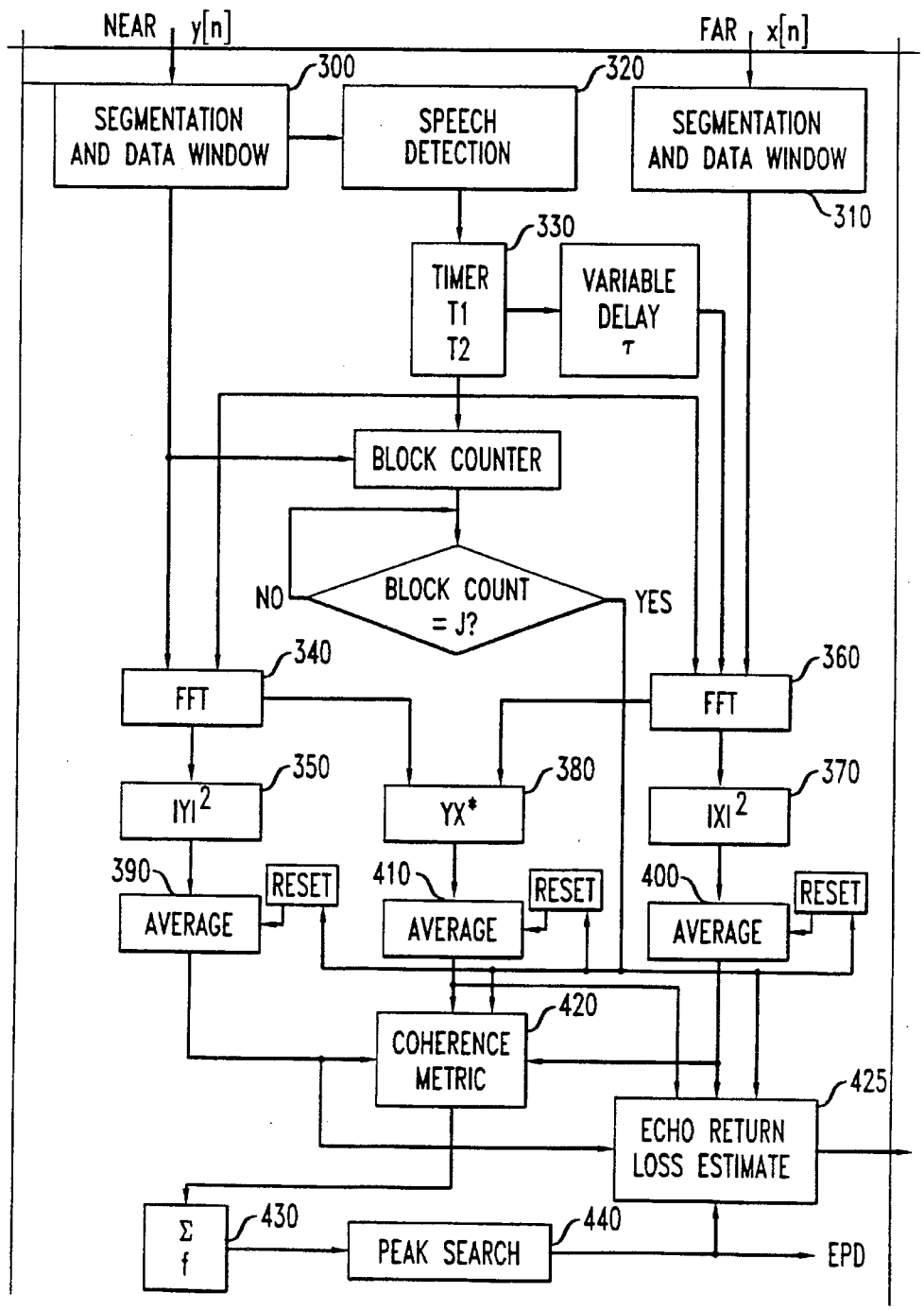
FIG. 6 is a schematic representation of the procedure for measuring the echo-path delay, according to the invention in one embodiment.

This optional loss measurement is best illustrated in block 425 of FIG. 6. The loss measurement may be useful for adjusting the amount of attenuation to be applied to the template (see below), and it can also be used as a control signal for determining when to enable the sub-band signal processing in block 130 of FIG. 3.

In block 110, tapped-off portions of the outbound near speech are subjected to a delay of EPD[n], to yield a delayed, full-band, near-speech signal y[n-EPD]. This delayed signal is used to create the template which, as noted, represents the expected echo envelope after attenuation.

In block 120, the delayed near-speech signal is decomposed into a plurality of frequency sub-bands, numbered from 1 to M. Each sub-band signal, exemplarily the k'th sub-band signal $ya_k[n]$, is separately subjected to sub-band signal processing. As depicted in the figure, each sub-band signal is processed in a respective processing block 130. In currently preferred embodiments, the processor represented by frequency analysis block 120 is a polyphase analysis filter bank with sample-rate reduction, which produces decimated sub-band signals.

The use of polyphase filter banks is particularly attractive because it offers relatively high computational efficiency. These filter banks are well-known in the an and need not be described here in detail. A useful reference in this regard is P. P. Vaidyanathan, "Multirate Systems and Filterbanks," Chapter 8, Prentice Hall, 1993.

Our currently preferred approach employs cosine-modulated filter banks which are implemented in computationally efficient, polyphase structures. This approach leads to straightforward design, relatively low computational requirements, and excellent frequency-response characteristics which lead to minimal distortion upon reconstruction of the full-band signal. A useful reference in this regard is K. Nayebi et al., "On the Design of FIR Analysis-Synthesis Filterbanks with High Computational Efficiency," *IEEE Trans. Signal Processing* 42 (April 1994).

As a general matter, we believe that the selective regulation of individual frequency sub-bands leads to higher operational stability and better voice quality than are achieved using conventional, fullband nonlinear processors for reducing echo. Moreover, the sub-band approach has a greater tendency to give the impression of a full-duplex connection, because the most active frequency bands for the far-end talker may differ from those for the echo of the local talker. Still further, noise pumping tends to be less noticeable with sub-band than with fullband processing, even without the feature, described above, of transparency to subthreshold noise.

Also processed in respective blocks 130 are M sub-band signals obtained by decomposing the far input signal x[n] in block 140. In currently preferred embodiments, the processor represented by block 140 is also a polyphase analysis filter bank with sample-ram reduction, which produces decimated sub-band signals. For each value of k (k assumes integer values from 1 to M), the k'th sub-band far-end signal $xa_k[n]$ is subjected, in block 130, to a center-clipping operation that relies upon a comparison between the sub-band far-end signal and the contemporaneous value of the template.

The output of each sub-band processing block 130 is a respective, processed sub-band signal $xe_k[n]$. The M processed sub-band signals are recombined in frequency synthesis block 150 to produce a full-band output signal $x_{po}[n]$. In currently preferred embodiments, the processor of block 150 is a polyphase synthesis filter bank. Filter banks of this kind are described, e.g., in Vaidyanathan, described above, and in Nayebi et al., described above.

At block 135, a full-band speech detector is optionally used to disable the sub-band processing of block 130 when far speech is detected, and to enable the sub-band processing at other times. These enablement and disablement functions are exemplarily performed through appropriate settings of a flag having a PERMIT state and a DENY state. A fullband estimate of the echo loss may be useful, in this regard, for determining when the energy in input x[n] is actual far speech, rather than an echo of near speech. That is, x[n] may be classified as far speech, rather than echo, if its energy envelope represents a greater fraction of the delayed energy envelope of y[n] than would be predicted on the basis of echo loss alone. In the figure, block 135 is shown having an input for a signal that represents such an echo-loss estimate. An appropriate such estimate may be provided by block 425 of FIG. 6.

A currently preferred speech detector for this purpose may be obtained from the GSM 06.32 VAD Standard discussed in "The Voice Activity Detector for the PAN-EUROPEAN Digital Celular Mobile Telephone Service," by D. K. Freeman et al., in IEEE Conf. ICASSP, 1989, Section S7.6, pages 369–372. This speech detector is preferred because it is known to operate reliably in the presence of noise. However, other speech detectors, well-known in the art, are also readily used for this purpose.

In accordance with currently preferred embodiments of the invention, further details of the processing in block 130 of the decimated k'th sub-band signals $ya_k[n]$ and $xa_k[n]$ are now described with reference to FIG. 4.

In block 200, the magnitude of the near-end signal waveform $ya_k[n]$ is determined and passed to block 210. Similarly, in block 220, the magnitude of the far-end signal waveform $xa_k[n]$ is determined and passed to block 230. Each of blocks 210 and 230 represents a peak-preserving, smoothing operation having a relatively fast rise time and a slower decay. At least in block 210, it is desirable for the decay to approximate the expected echo reverberation tail.

Exemplarily, the smoothed output $yb_k[n]$ of block 210 is expressed by the recursive average $$\begin{cases} \text{if } |ya_k[n]| \geq yb_k[n] \text{ (rising condition):} \\ yb_k[n] = A2 \cdot |ya_k[n]| + (1-A2) \cdot yb_k[n-1]; \\ \text{if } |ya_k[n]| < yb_k[n] \text{ (falling condition):} \\ yb_k[n] = A3 \cdot |ya_k[n]| + (1-A3) \cdot yb_k[n-1], \end{cases}$$

where A2 is selected to be near unity to ensure a fast rise time, and A3 is selected to have a decay on the order of 40–50 ms.

We have found that our system can be made less sensitive to errors in estimating the echo-path delay by adding to the formula for $yb_k[n]$ a provision for holding over peaks in $ya_k[n]$ for a predetermined holdover period. This holdover period is preferably set to the expected delay through the remote network, which is typically 20–40 ms. In our currently preferred embodiment, the holdover provision is applied according to the following instructions: (i) if the rising condition is met, update $yb_k[n]$ and initiate a holdover period; (ii) if the falling condition is met, update $yb_k[n]$ only if the last holdover period has expired.

Optional adjustments to the expected echo path loss $EPL_k[n]$ are made in block 240. It should be noted in this regard that in conventional center clippers, a fixed value of the minimum expected loss is predetermined. This value is typically about 18 dB for purposes of residual echo control in telecommunication networks. However, it may be advantageous to make adjustments in this expected loss figure if, for example, the template energy level shows a tendency to exceed the actual energy levels of the received echo signals.

Our current practice is to predetermine a fixed, minimum expected loss across all sub-bands, typically in the range 10–12 dB, and to set EPL equal to this value. This loss value can, for example, be readily determined from network measurements taken by monitoring the inter-network trunks for an appropriate length of time.

However, it may in at least some cases be desirable to use a different, fixed value of $EPL_k$ for each frequency band k. This permits shaping of the loss value according to, e.g., perceptual criteria or the results of network measurements.

Another alternative is to determine EPL[n] adaptively, either across all frequency sub-bands, or individually within respective sub-bands. According to this alternative, the predetermined minimum expected loss can serve as a lower bound for EPL, with adjustments in EPL guided by the results of a loss calculation. An appropriate full-band loss calculation is discussed above.

In yet another alternative, the loss may be determined by actively probing the remote network with a known signal, and analyzing the returned echo.

In block 250, the near-end envelope from block 210 is multiplied by the loss estimate to yield a waveform-following threshold $CL1_k[n]$:

$$CL1_k[n]=EPL[n] \times yb_k[n].$$

In block 230, the far input is smoothed in a manner similar to the smoothing of the near input in block 210. The smoothed far input signal is useful for performing the optional loss adjustment of block 240, and for performing the noise-floor estimate of blocks 260 and 265, which is described below.

The smoothed output $xb_k[n]$ of block 230 is exemplarily expressed by the recursive average $$\begin{cases} \text{if } |xa_k[n]| \geq xb_k[n]: \\ xb_k[n] = A4 \cdot |xa_k[n]| + (1-A4) \cdot xb_k[n-1]; \\ \text{if } |xa_k[n]| < xb_k[n]: \\ xb_k[n] = A5 \cdot |xa_k[n]| + (1-A5) \cdot xb_k[n-1], \end{cases}$$

where A4 is selected to be near unity to ensure a fast rise time, and A5 is selected to have a decay on the order of 40–50 ms.

The output $xb_k[n]$ of block 230, which represents a smoothed far-end envelope, is processed in block 260 to yield an estimate $xc_k[n]$ of the noise level from the remote network. By way of example, the output $xb_k[n]$ Of block 230 is subjected to the recursive average defined by:

$$\begin{cases} \text{if } |xb_k[n]| \geq xc_k[n]: \\ xc_k[n] = A6 \cdot |xb_k[n]| + (1-A6) \cdot xc_k[n-1]; \\ \text{if } |xb_k[n]| < xc_k[n]: \\ xc_k[n] = A7 \cdot |xb_k[n]| + (1-A7) \cdot xc_k[n-1], \end{cases}$$

where A6 is selected to be relatively small in order to ensure a slow rise time, and A7 is selected to have a short decay, on the order of 1–5 ms.

Figure 4:
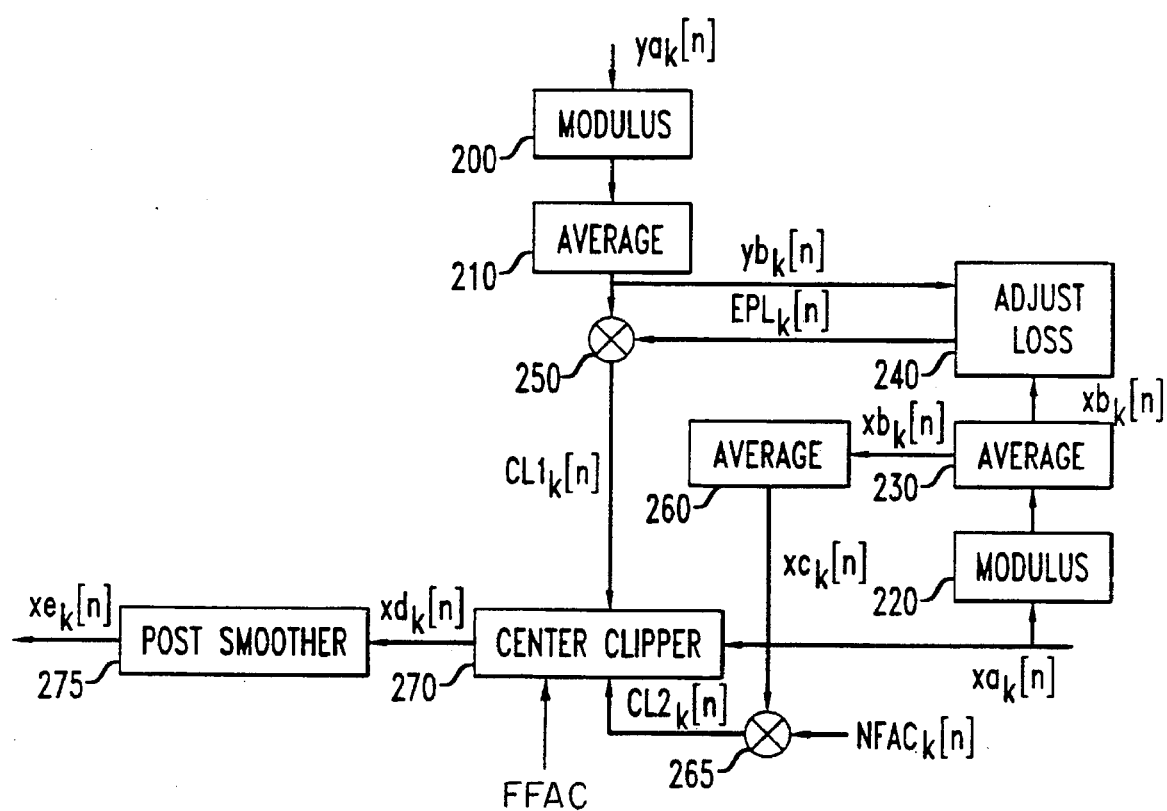
FIG. 4 is a schematic representation of the functions performed by the sub-band signal processing block of FIG. 3.

From the far-end noise estimate $xc_k[n]$, a waveform-following lower threshold (i.e., a noise floor) $CL2_k[n]$ is derived, as shown in block 265 of FIG. 4. By way of example, this threshold is derived by multiplying the noise estimate by an optional scale factor $NFAC_k[n]$ which typically assumes values between 0.5 and 1.5. Moreover, the threshold $CL2_k[n]$ is advantageously constrained to never exceed the expected echo level. Thus, an exemplary lower threshold is defined by the formula:

$$CL2_k[n]=\min(NFAC_k[n] \times xc_k[n], CL1_k[n]).$$

We have found that the noise-floor estimate can be improved still further, if the smoothing of $xa_k[n]$ and $xb_k[n]$ is performed only when the far input contains only noise, and not speech. The far-end speech detector of block 135 of FIG. 3 is readily used to distinguish between the situation where speech (or echo) is present, and the situation where there is only noise. Accordingly, the noise-floor estimation is disabled in the first instance, and enabled in the second instance.

In block 270, the far-end, sub-band, input signal $xa_k[n]$ is subjected to center clipping. According to a currently preferred embodiment of the invention, the input signal is attenuated whenever its absolute value falls between the thresholds $CL2_k[n]$ and $CL1_k[n]+CL2_k[n]$, but passed without attenuation if either: (1) it falls above $CL1_k[n]+CL2_k[n]$; or (2) it falls below $CL2_k[n]$.

Figure 5:
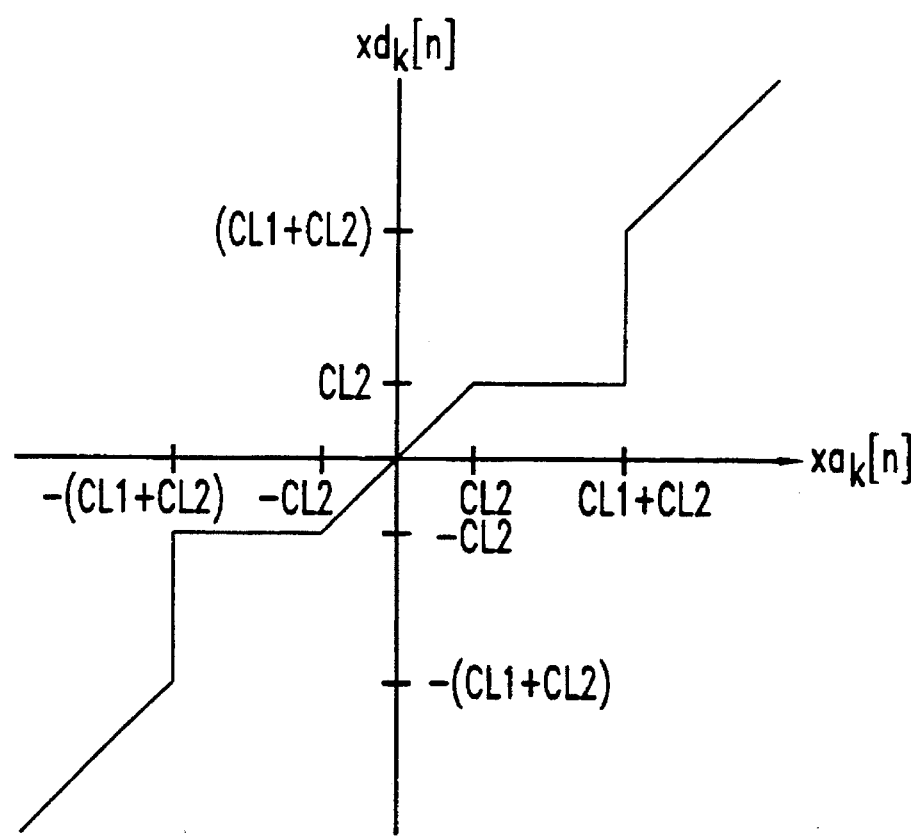
FIG. 5 is a representation of a transfer function for a center clipper according to the invention, in one embodiment.

The transfer function of our currently preferred center clipper is illustrated in FIG. 5. As is evident from the figure, this clipper passes the input signal substantially without attenuation if the signal absolute value is less than the lower threshold CL2 or greater than the upper threshold CL1+CL2. (In the figure, the subscript k and the explicit dependence on quantized time n have been dropped for purposes of brevity.) However, in the intermediate region between these thresholds, the input signal is clipped to a flat output level of CL2.

We have observed that when noise is relatively high within a given sub-band k, some reduced and distorted echo may be transmitted by the center clipper in that sub-band. In order to mask this echo component, we have found that it is helpful to mix the transmitted sub-band signal with a white-noise component (i.e., a noise component that has a flat spectrum within the given sub-band k). According to our currently preferred procedure, a sub-band signal level $(1-FFAC) \times xa_k$ is mixed with a white-noise level $FFAC \times CL2_k[n]$. We typically select a value of FFAC in the range 25%–50%. Because the added noise spectrum is flat only within each sub-band, the resultant synthesized fullband output will approximate the fullband noise spectrum.

In block 275, an optional post-smoothing function removes spurious spikes from the output of clipper 270. According to one post-smoothing procedure, which is similar to a median filter, a determination is made whether the current sample of the signal $xd_k[n]$ is occurring during far-end speech. This determination is based on the output of speech detector 320, in conjunction with a loss measurement, as described above. If far-end speech is absent and the current signal block contains isolated peaks bounded by clipped samples of the signal, then the entire block is clipped. On the other hand, if far-end speech is detected, the clipped values are restored in the entire block. For this purpose, block sizes of about 10–20 ms are currently preferred.

Additionally, block 275 may provide further attenuation of those segments of the clipped far-end signal that contain only noise.

As noted, a full-band estimate EPD[n] of the echo-path delay is calculated in block 100 of FIG. 3. A currently preferred method for calculating this delay is now discussed with reference to FIG. 6. This method is based upon the calculation of a frequency-domain coherence metric. This metric is evaluated from periodogram estimates of the autospectra of the near-end and far-end signals, respectively, and a periodogram estimate of their cross-spectrum. Methods of this kind are described, generally, in G. Clifford Carter, ed., *Coherence and Time Delay Estimation*, IEEE Press, 1993. However, unlike conventional methods, our method evaluates the coherence metric, and terminates with a normalized energy metric before performing an inverse FFT to transform from the frequency domain back to the time domain. This modification yields a less accurate time estimate than the full estimation method described in Carter, but it reduces our computational requirements and memory usage, and it is sufficient for our present purposes.

The near-end input y[n] and the far-end input x[n] are each received in real time, and in blocks 300 and 310 of the figure, respectively, these input signals are segmented into overlapping blocks. A time window, such as a Hanning window, weights the samples in each block. We currently prefer to use a block size of 240 samples, with an overlap of 33%, i.e., of 80 samples.

The delay calculation is intended to operate only on near-end speech, and on that portion of the returning far-end signal that is presumed to contain echoes of near-end speech. Thus, the delay calculation is initiated only when near-end speech signals are detected. For this purpose, a speech detector 320 gives a "go-ahead" signal when it determines that the near-end party is speaking. We are currently using a speech detector that employs a simple energy measure to identify speech activity from the near end. Speech detectors of this kind are well-known in the art, and need not be described here in detail.

It is desirable to avoid unnecessary computation during intervals when no echo is expected. All echoes following the initiation of a given burst of near speech will be expected to occur within some period of time. We select a duration $T_2$, typically about 1000 ms, to represent this time period. Moreover, the first echo is expected to occur after some minimum transmission delay. We select a duration $T_1$ to represent this delay. Although $T_1$ can optionally be set to 0, we prefer to use a nonzero (finite) value, typically about 150 ms.

The durations $T_1$ and $T_2$ are stored in timer 330. This timer limits the processing of the far-end signal to those far-end blocks that arrive at a delay between $T_1$ and $T_2$, relative to the current near-end block in process.

When speech detector 320 determines that the speech energy of the kth near-end signal block exceeds a preset threshold, the speech detector issues the go-ahead signal. In response, the near signal block is padded with zeroes and transformed to a frequency-domain signal Y(f) using a Fast Fourier Transform (FFT), as indicated in block 340 of the figure. By way of example, we currently prefer to use an FFT that has a length of 256 points and requires a padding of 16 zeroes. The autospectrum of the near-end signal is obtained by taking the squared modulus of Y(f); i.e., by forming $|Y(f)|^2$, as indicated in block 350 of the figure.

Similarly, those far-end signal blocks that are received between $T_1$ and $T_2$ milliseconds after the detection of near-end speech are padded with zeroes and subjected to FFT 360, which is of the same size as FFT 340. However, this far-end, frequency-domain signal is calculated at each of a plurality of discrete values of a variable time delay $\tau$, which lies within the interval from $T_1$ to $T_2$. Successive $\tau$ values are separated by, e.g., 160 samples (⅔ the length of a block). The resulting frequency-domain signal is denoted $X(\tau,f)$. The far-end autospectrum (for each of the discrete delays $\tau$) is formed by taking the squared modulus $|X(\tau,f)|^2$, as indicated in block 370 of the figure.

A cross-spectrum is formed for each delayed block between $T_1$ and $T_2$, as indicated in block 380 of the figure. This cross-spectrum is the product of the near-end, frequency-domain signal, times the complex conjugate of the far-end, frequency-domain signal. Like the far-end autospectrum, this cross-spectrum $YX^*(\tau,f)$ is dependent on the delay $\tau$.

We continually update the whole set of spectra $Y(f)$, $X(\tau,f)$, and $YX^*(\tau,f)$. According to our currently preferred procedure, we produce a smoothed, periodogram estimate once for every J detected blocks of near-end speech, with J set equal to 25. Each of the resulting aperiodic periodograms is an average, exemplarily a straight average, of the autospectra and cross-spectra over the J detected blocks. The resulting average spectra are denoted, below, by $SY(f)$, $SX(\tau,f)$, and $SYX(\tau,f)$, respectively.

The averaging of near-end autospectra is shown in the figure as taking place in block 390, the averaging of the far-end autospectra is shown as taking place in block 400, and the averaging of the cross-spectra is shown as taking place in block 410.

In order to increase the speed and reduce the memory requirements of this procedure, it is advantageous to decimate the frequency pickets of the autospectra and the cross-spectra. The degree of decimation that can be tolerated will depend upon the expected spectral smoothness of the near-end speech. In our current trials, we are using a spectral decimation factor of 2, and a speech band spanning 187–3187 Hz, but we believe that a speech band of 187–2000 Hz may be adequate.

At the end of each sequence of J near-end speech blocks, a squared-coherence metric is formed at each value of the delay $\tau$, as indicated in block 420 of the figure. This metric is expressed by the formula $$C(\tau,f) = \frac{|SYX(\tau,f)|^2}{SY(f) \times SX(\tau,f)}.$$

This normalized squared-coherence metric is summed over the decimated spectral band of interest, which is currently 187–3187 Hz for applications relating to telephonic speech, to yield a coherence-energy function $C(\tau)$ which depends upon the discrete time delay $\tau$. The frequency-summing procedure is indicated in block 430 of the figure.

As indicated in block 440 of the figure, $C(\tau)$ is then subjected to a procedure for finding peak values of the function. This procedure identifies echo-path delay, EPD, as that discrete $\tau$ value where $C(\tau)$ has a local peak value. As further signal blocks are received, the squared-coherence metric is recalculated. This permits the estimated echo-path delay to be tracked throughout the conversation time interval. More than one EPD may be present, and each is detected and tracked from local thresholds of $C(\tau)$ that lie above a prescribed detection threshold.

If greater accuracy in the delay estimate or estimates EPD is needed, the function $C(\tau)$ can be inverse Fourier transformed and the resulting autocorrelation estimate searched for maximum time positions within each discrete $\tau$ subinterval. For the block sizes and overlaps we have used, it does not appear necessary to carry the delay calculations through this last transform step in order to get sufficient delay accuracy in EPD. The sum of $C(\tau)$ is a sufficient metric to test to detect EPD.

Significantly, the determination that there is at least one local peak value of $C(\tau)$ is itself an indication that echo is present. Thus, this echo-delay measurement technique can itself be a basis for an echo detector in a communication system.

Our invention will be useful in various kinds of communication systems which suffer from the arrival of echoes after some delay. This delay will generally include a component due to the propagation time over the echo path. However, in certain applications there may be a further, and even a dominant, component due to signal processing. Delays of this kind include coding delays in cellular communication systems and in teleconferencing systems. We believe that our invention will be useful in these applications.

In particular, we believe that our invention will be useful in connection with conference communication apparatus at the far end, such as a speakerphone or a teleconferencing system. In this context, our invention will be useful for removing residual echo due to incomplete echo cancellation in the conference communication apparatus.

When our invention is used to reduce echo in international telephone calls, a preferred situs for the herein-described signal processing to take place is within the international switching center, and preferably on the international trunk line at a point just beyond (i.e., on the international side of) the gateway exchange. This places the processing apparatus at a unique transmission point for all telephone calls passing to and from that trunk line.

When our invention is used to reduce echo in domestic cellular telephone calls, one desirable way to situate the processing apparatus is to connect it to the trunks that link to the cellular office.

When our invention is used to reduce echo in domestic satellite links, it is advantageous to connect the processing apparatus to the receiving channel from the satellite.

By way of illustration, our working prototype of the invention is running on an Analog Devices ADSP-21020 digital signal processor. It should be noted, however, that even signal processors of substantially less computational power are usefully employed as host machines for the methods described herein.

The invention claimed is:

1. A method for processing FAR-IN communication signals received by a FIRST network from a SECOND network, thereby to reduce energy content that is attributable to echoes, returned by the SECOND network, of NEAR-IN signals that were placed in the FIRST network for transmission to the SECOND network, the method comprising:

a) measuring a delay between the NEAR-IN signals and the arrival of corresponding echoes in the FAR-IN signals;

b) processing a copy of the NEAR-IN signals to create a time-varying signal which represents the smoothed energy content of the NEAR-IN signals delayed by the measured delay and attenuated by an estimated transmission loss for echoes, said time-varying signal to be referred to as a TEMPLATE;

c) in a non-linear processor, passing the FAR-IN signals substantially without attenuation if they exceed a threshold derived at least in part from the TEMPLATE; and d) in the non-linear processor, attenuating the FAR-IN signals if they lie within a defined range below said threshold.

2. The method of claim 1, wherein the delay-measuring step comprises:

evaluating a frequency-domain coherence metric $C(\tau; f)$ of the NEAR-IN and FAR-IN signals, said metric is a function of frequency f and the relative delay $\tau$ between said signals;

summing said metric $C(\tau;f)$ over a frequency band of interest, whereby a coherence-energy function $C(\tau)$ is obtained; and identifying a local peak value of said function $C(\tau)$.

3. The method of claim 2, wherein the metric $C(\tau;f)$ is expressed by:

$$C(\tau;f) = \frac{|SYX(\tau;f)|^2}{SY(f) \times SX(\tau;f)},$$

wherein f represents frequency, SY(f) is an averaged autospectrum of the NEAR-IN signal, $SX(\tau;f)$ is an averaged autospectrum of the FAR-IN signal, and $SYX(\tau;f)$ is an average of the cross-spectrum of the NEAR-IN and FAR-IN signals.

4. The method of claim 1, wherein the threshold is equal to the TEMPLATE.

5. The method of claim 1, wherein the threshold is derived by summing the TEMPLATE with a value derived from an estimate of a noise level being received in the corresponding sub-bond from the SECOND network.

6. A method for processing FAR-IN communication signals received by a local network from a remote network, thereby to reduce energy content that is attributable to echoes, returned by the remote network, of NEAR-IN signals that were placed in the local network for transmission to the remote network, the method comprising:

a) measuring a delay between the NEAR-IN signals and the arrival of corresponding echoes in the FAR-IN signals;

b) analyzing the FAR-IN signals into a plurality of frequency sub-band components to be referred to as FAR-IN sub-band signals, delaying the NEAR-IN signals by the measured delay, and analyzing the delayed NEAR-IN signals into a plurality of frequency sub-band components, to be referred to as NEAR-IN sub-band signals;

c) processing a copy of each NEAR-IN sub-band signal to create a time-varying signal which represents the smoothed energy content of the NEAR-IN sub-band signal delayed by the measured delay and attenuated by an estimated transmission loss for echoes, said time-varying signal to be referred to as a TEMPLATE;

d) in a non-linear processor, passing each FAR-IN sub-band signal substantially without attenuation if it exceeds a threshold derived at least in part from the corresponding TEMPLATE;

e) in the non-linear processor, attenuating each FAR-IN sub-band signal if it lies within a defined range below the corresponding said threshold; and f) synthesizing the nonlinearly processed FAR-IN sub-band signals to form an echo-reduced fullband FAR-IN signal.

7. The method of claim 6, wherein the delay-measuring step comprises:

evaluating a frequency-domain coherence metric $C(\tau; f)$ of the NEAR-IN and FAR-IN signals, said metric is a function of frequency f and the relative delay $\tau$ between said signals;

summing said metric $C(\tau;f)$ over a frequency band of interest, whereby a coherence-energy function $C(\tau)$ is obtained; and identifying a local peak value of said function $C(\tau)$.

8. The method of claim 7, wherein the metric $C(\tau;f)$ is expressed by:

$$C(\tau;f) = \frac{|SYX(\tau;f)|^2}{SY(f) \times SX(\tau;f)},$$

wherein f represents frequency, SY(f) is an averaged autospectrum of the NEAR-IN signal, $SX(\tau;f)$ is an averaged autospectrum of the FAR-IN signal, and $SYX(\tau;f)$ is an average of the cross-spectrum of the NEAR-IN and FAR-IN signals.

9. The method of claim 6, wherein:

the method further comprises a step of setting, for each FAR-IN sub-band signal, a NOISE LEVEL which at each time of interest is less than or equal to the corresponding TEMPLATE signal; and for each FAR-IN sub-band signal, steps (d) and (e) are carried out such that said FAR-IN sub-band signal is passed without attenuation if it falls below the NOISE LEVEL.

10. The method of claim 9, wherein for each FAR-IN sub-band signal, the step of setting the corresponding NOISE LEVEL comprises:

acquiring an energy envelope of the FAR-IN sub-band signal; and smoothing said envelope in an averaging procedure.

11. The method of claim 10, further comprising testing for the presence of FAR-IN signal energy, and wherein the step of acquiring an energy envelope of each FAR-IN sub-band signal is carried out only when no significant FAR-IN signal energy is detected.

12. The method of claim 9, wherein the attenuating step comprises clipping the FAR-IN sub-band signal to a predetermined level.

13. The method of claim 12, wherein the predetermined level is substantially equal to the NOISE LEVEL.

14. The method of claim 12, wherein: the attenuating step further comprises mixing the clipped FAR-IN sub-band signal with a noise component; the noise component has a substantially flat frequency spectrum within the relevant sub-band; and the mixing step is carried out such that the level of the resulting mixed signal is substantially equal to the NOISE LEVEL.

15. The method of claim 6, wherein each threshold is equal to the corresponding TEMPLATE.

16. The method of claim 6, wherein each threshold is derived by summing the corresponding TEMPLATE with a value derived from an estimate of a noise level being received in the corresponding sub-band from the SECOND network.

17. In a communication system that comprises a local network and a remote network, wherein a sender at a remote location places FAR SPEECH communication signals in the remote network for transmission to the local network, and the local network receives said signals as FAR-IN signals, a method for processing the FAR-IN signals, thereby to reduce energy content that is attributable to echoes, returned by the remote network, of NEAR-IN signals that were placed in the local network for transmission to the remote network, the method comprising:

a) measuring a delay between the NEAR-IN signals and the arrival of corresponding echoes in the FAR-IN signals;

b) testing for energy in the FAR-IN signals that is attributable to FAR SPEECH, setting a flag to a DENY state when said energy is detected, and setting the flag to a PERMIT state when said energy is not detected;

c) analyzing the FAR-IN signals into a plurality of frequency sub-band components to be referred to as FAR-IN sub-band signals, delaying the NEAR-IN signals by the measured delay, and analyzing the delayed NEAR-IN signals into a plurality of frequency sub-band components, to be referred to as NEAR-IN sub-band signals;

d) processing a copy of each NEAR-IN sub-band signal to create a time-varying signal which represents the smoothed energy content of the NEAR-IN sub-band signal delayed by the measured delay and attenuated by an estimated transmission loss for echoes, said time-varying signal to be referred to as a TEMPLATE;

e) passing each FAR-IN sub-band signal through a non-linear processor substantially without attenuation if said FAR-IN sub-bond signal exceeds a threshold derived at least in part from the corresponding said TEMPLATE;

f) passing each FAR-IN sub-band signal through the non-linear processor with attenuation if said signal lies within a defined range below the corresponding said threshold; and g) synthesizing the passed-through FAR-IN sub-band signals to form an echo-reduced fullband FAR-IN signal; wherein h) steps (c)–(g) are carried out only when the flag is set to the PERMIT state.

18. The method of claim 17, wherein each FAR-IN sub-band signal, after passing through the non-linear processor, is subdivided into plural blocks, each said block having a duration in the range 10–20 ms, and each said block comprising a plurality of signal samples, the method further comprising, after the passing-through steps, the steps of:

if FAR SPEECH is detected during a time interval that corresponds to any block, restoring all samples in that block to their amplitudes prior to the attenuation; and if FAR SPEECH is not detected during a time interval that corresponds to any block, attenuating all samples in that block that represent isolated peaks of signal amplitude.

19. A method for reducing, in signals received by a local telephone user from a conference-communication device at a remote location, said received signals to be referred to as FAR-IN signals, that energy content that is attributable to echoes of the local user's voice that are returned to the local user due to incomplete echo cancellation in the conference-communication device, the method comprising:

a) measuring a delay between signals transmitted into the telephone network by the local user, said transmitted signals to be referred to as NEAR-IN signals, and the arrival of corresponding echoes in the FAR-IN signals;

b) processing a copy of the NEAR-IN signals to create a time-varying signal which represents the smoothed energy content of the NEAR-IN signals delayed by the measured delay and attenuated by an estimated transmission loss for echoes, said time-varying signal to be referred to as a TEMPLATE;

c) in a non-linear processor, passing FAR-IN signals substantially without attenuation if they exceed a threshold derived at least in part from the TEMPLATE; and d) in the non-linear processor, attenuating FAR-IN signals if they lie within a defined range below the said threshold.

20. Apparatus for processing FAR-IN communication signals received by a local network from a remote network, thereby to reduce energy content that is attributable to echoes, returned by the remote network, of NEAR-IN signals that were placed in the local network for transmission to the remote network, comprising:

a) means for measuring a delay between NEAR-IN signals and the arrival of corresponding echoes in the FAR-IN signals;

b) means for analyzing the FAR-IN signals into a plurality of frequency sub-band components to be referred to as FAR-IN sub-band signals, delaying the NEAR-IN signals by the measured delay, and analyzing the delayed NEAR-IN signals into a plurality of frequency sub-band components, to be referred to as NEAR-IN sub-band signals;

c) means for receiving a copy of each NEAR-IN sub-band signal and for processing each said copy to create a time-varying output signal, to be referred to as a TEMPLATE, which represents the smoothed energy content of the NEAR-IN sub-band signal delayed by the measured delay and attenuated by an estimated transmission loss for echoes;

d) a non-linear processor, adapted to pass each FAR-IN sub-band signal substantially without attenuation if it exceeds a threshold derived at least in part from the corresponding TEMPLATE and to attenuate each FAR-IN sub-band signal if it lies within a defined range below the corresponding said threshold; and e) means for synthesizing the nonlinearly processed FAR-IN sub-band signals to form an echo-reduced fullband FAR-IN signal.

21. Apparatus of claim 20, wherein:

the apparatus further comprises means for setting, for each FAR-IN sub-band signal, a NOISE LEVEL which at each time of interest is less than or equal to the corresponding TEMPLATE signal; and the non-linear processor is adapted to pass each FAR-IN sub-band signal substantially without attenuation if it falls below the NOISE LEVEL.

22. Apparatus of claim 21, wherein the non-linear processor is adapted to attenuate FAR-IN sub-band signals by clipping said signals to a predetermined level.

23. Apparatus of claim 22, wherein the predetermined level is substantially equal to the NOISE LEVEL.

24. Apparatus of claim 22, further comprising means for mixing each clipped FAR-IN sub-band signal with a noise component having a substantially flat frequency spectrum within the relevant sub-band, such such that the level of the resulting mixed signal is substantially equal to the NOISE LEVEL.

25. Apparatus for reducing, in signals received by a local telephone user from a conference-communication device at a remote location, said received signals to be referred to as FAR-IN signals, that energy content that is attributable to echoes of the local user's voice that are returned to the local user due to incomplete echo cancellation in the conference-communication device, comprising:

a) means for measuring a delay between signals transmitted into the telephone network by the local user, said transmitted signals to be referred to as NEAR-IN signals, and the arrival of corresponding echoes in the FAR-IN signals;

b) means for receiving a copy of the NEAR-IN signals and for processing said copy to create a time-varying output signal, to be referred to as a TEMPLATE, which represents the smoothed energy content of the NEAR-IN signals delayed by the measured delay and attenuated by an estimated transmission loss for echoes; and c) a non-linear processor, adapted to pass FAR-IN signals substantially without attenuation if they exceed a threshold derived at least in part from the TEMPLATE and to attenuate FAR-IN signals if they lie within a defined range below the said threshold.

26. A communication system, comprising a FIRST network and a SECOND network connected through a communication medium, wherein NEAR-IN communication signals are placed in the FIRST network for transmission to the SECOND network, and FAR-IN communication signals are received by the FIRST network from the SECOND network; and further comprising apparatus for processing the FAR-IN signals, thereby to reduce energy content that is attributable to echoes, returned by the SECOND network, of NEAR-IN signals, wherein said communication system comprises:

a) means for measuring a delay between NEAR-IN signals and the arrival of corresponding echoes in the FAR-IN signals;

b) means for receiving a copy of the NEAR-IN signals and for processing said copy to create a time-varying output signal, to be referred to as a TEMPLATE, which represents the smoothed energy content of the NEAR-IN signals delayed by the measured delay and attenuated by an estimated transmission loss for echoes; and c) a non-linear processor adapted to pass FAR-IN signals substantially without attenuation if they exceed a threshold derived at least in part from the TEMPLATE and to attenuate FAR-IN signals if they lie within a defined range below the said threshold.

27. The communication system of claim 26, wherein the communication signals are telephone signals, and the FIRST and SECOND networks are telephone networks.

28. The communication system of claim 27, wherein at least the FIRST telephone network is a cellular telephone network.

29. The communication system of claim 27, wherein at least the SECOND telephone network is a cellular telephone network.

30. The communication system of claim 27, wherein the FIRST and SECOND networks are interconnected by a satellite link.

31. The communication system of claim 27, wherein the FIRST and SECOND networks are interconnected by an international trunk line.

32. Apparatus of claim 26, wherein the delay-measuring means comprise:

means for evaluating a frequency-domain coherence metric $C(\tau;f)$ of the NEAR-IN and FAR-IN signals, said metric a function of frequency f and the relative delay $\tau$ between said signals;

means for summing said metric $C(\tau;f)$ over a frequency band of interest, whereby a coherence-energy function $C(\tau)$ is obtained; and means for identifying a local peak value of said function $C(\tau)$.

33. In a communication system that comprises FIRST and SECOND networks connected by a transmission medium, wherein NEAR-IN communication signals are placed in the FIRST network for transmission to the SECOND network, and FAR-IN communication signals are received by the FIRST network from the SECOND network, a method for detecting echoes of NEAR-IN signals that are returned to the FIRST network by the SECOND network, the method comprising:

evaluating a frequency-domain coherence metric $C(\tau;f)$ of the NEAR-IN and FAR-IN signals, said metric a function of frequency f and of a relative delay $\tau$ between said signals;

summing said metric $C(\tau; f)$ over a frequency band of interest, whereby a coherence-energy function $C(\tau)$ is obtained; and identifying a local peak value of said function $C(\tau)$.

34. The method of claim 33, wherein the metric $C(\tau;f)$ is expressed by:

$$C(\tau;f) = \frac{|SYX(\tau;f)|^2}{SY(f) \times SX(\tau;f)},$$

wherein f represents frequency, SY(f) is an averaged autospectrum of the NEAR-IN signal, $SX(\tau,f)$ is an averaged autospectrum of the FAR-IN signal, and $SYX(\tau;f)$ is an average of the cross-spectrum of the NEAR-IN and FAR-IN signals.

35. Apparatus for detecting echoes in a communication system that comprises FIRST and SECOND networks connected by a transmission medium, wherein NEAR-IN communication signals are placed in the FIRST network for transmission to the SECOND network, and FAR-IN communication signals are received by the FIRST network from the SECOND network, and wherein said echoes are echoes of NEAR-IN signals that are returned to the FIRST network by the SECOND network, the apparatus comprising:

means for evaluating a frequency-domain coherence metric $C(\tau; f)$ of the NEAR-IN and FAR-IN signals, said metric a function of frequency f and of a relative delay $\tau$ between said signals;

means for summing said metric $C(\tau; f)$ over a frequency band of interest, whereby a coherence-energy function $C(\tau)$ is obtained; and means for identifying a local peak value of said function $C(\tau)$.

* * * * *